United States Patent
Geiger et al.

(10) Patent No.: US 11,755,717 B2
(45) Date of Patent: Sep. 12, 2023

(54) SECURITY COMPLIANCE FOR A SECURE LANDING ZONE

(71) Applicant: International Business Machines Corporation, Armonk, NY (US)

(72) Inventors: Adam Robert Geiger, Cary, NC (US); Nataraj Nagaratnam, Cary, NC (US); Dinakaran Joseph, Apex, NC (US); Michael S. Law, Morrisville, NC (US); Priyank Narvekar, St. John's (CA); Hillery Hunter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 17/205,814

(22) Filed: Mar. 18, 2021

(65) Prior Publication Data
US 2022/0300603 A1    Sep. 22, 2022

(51) Int. Cl.
*G06F 21/52*    (2013.01)
*G06F 21/62*    (2013.01)

(52) U.S. Cl.
CPC .......... *G06F 21/52* (2013.01); *G06F 21/6209* (2013.01); *G06F 2221/032* (2013.01)

(58) Field of Classification Search
None
See application file for complete search history.

(56) References Cited

U.S. PATENT DOCUMENTS

| | | | |
|---|---|---|---|
| 8,589,557 B1 * | 11/2013 | Labat | G06F 9/5061 718/104 |
| 9,286,187 B2 | 3/2016 | Brucker et al. | |
| 9,977,908 B2 | 5/2018 | Mardikar et al. | |
| 10,142,370 B2 | 11/2018 | Goyal et al. | |
| 10,244,002 B2 | 3/2019 | Hoy et al. | |
| 10,348,767 B1 * | 7/2019 | Lee | H04L 63/0236 |
| 10,713,031 B2 | 7/2020 | Iyer et al. | |
| 2012/0011077 A1 | 1/2012 | Bhagat | |
| 2013/0212282 A1 * | 8/2013 | Pulier | H04L 47/822 709/226 |
| 2019/0079744 A1 * | 3/2019 | Bosch | G06F 8/60 |
| 2019/0278928 A1 * | 9/2019 | Rungta | G06F 9/5077 |
| 2020/0026850 A1 * | 1/2020 | Levin | G06F 9/455 |
| 2020/0065124 A1 * | 2/2020 | Chen | G06F 9/45558 |

(Continued)

FOREIGN PATENT DOCUMENTS

CN    106161378 A    11/2016
CN    109120575 A    1/2019

*Primary Examiner* — Michael Pyzocha
(74) *Attorney, Agent, or Firm* — Yee & Associates, P.C.

(57) ABSTRACT

A method, apparatus, system, and computer program product for configuring a computing environment. A configuration profile is identified by a computer system for the computing environment that is to be deployed in which the computing environment meets a security policy to run an application in the computing environment. A determination is made, by the computer system, as to whether the configuration profile for the computing environment meets the security policy for running the application in the computing environment. The configuration profile for the computing environment is deployed, by the computer system, to configure the computing environment for the application in response to the configuration profile meeting the security policy.

20 Claims, 8 Drawing Sheets

(56) References Cited

U.S. PATENT DOCUMENTS

| | | | |
|---|---|---|---|
| 2021/0157623 A1* | 5/2021 | Chandrashekar | G06F 9/5072 |
| 2021/0184928 A1* | 6/2021 | Lal | H04L 41/5048 |
| 2022/0046059 A1* | 2/2022 | Pandurangi | H04L 63/20 |
| 2022/0070225 A1* | 3/2022 | Drori | G06F 9/5027 |
| 2022/0116427 A1* | 4/2022 | Kwan | H04L 12/413 |
| 2022/0200869 A1* | 6/2022 | Erlingsson | H04L 67/10 |

* cited by examiner

US 11,755,717 B2

SECURITY COMPLIANCE FOR A SECURE LANDING ZONE

BACKGROUND

1. Field

The disclosure relates generally to an improved computer system and, more specifically, to a method, apparatus, system, and computer program product for configuring computing environments that comply with security policies.

2. Description of the Related Art

A cloud computing environment is an environment in which processing and storage resources can be available over a network such as the Internet. A cloud computing environment can provide these resources in the form of cloud services, which are infrastructure, platforms, or even software made available to users through the Internet. The cloud computing environment can deliver computing services such as servers, storage, databases, networking, software, analytics, and intelligence.

Cloud services in a cloud computing environment can provide flexibility, and customers can significantly lower operation costs by avoiding the capital expense of buying hardware and selecting only services that are needed. The cloud computing environment also offers reliability through a broad set of policies and controls to improve security against potential threats. Further, storage resources on the cloud can provide high availability of data and loss prevention from malware, viruses, or age-related hardware deterioration.

As a result, companies and other organizations increasingly look to cloud providers to deploy workloads. With this type of workload deployment, different types of regulations and controls become relevant. Cloud providers can implement security compliance within the cloud computing environment. For example, when a customer onboards a sensitive or regulated application onto a cloud platform, various security controls can be required to ensure that the application meets a security policy. This security policy can be set by an organization, industry rules, federal regulations, federal statutes, or other sources.

Cloud providers can also monitor security metrics as well as other metrics specified by a customer. This monitoring of security metrics can be used to ensure that the cloud computing environment meets the security policy for the application running in the cloud platform.

SUMMARY

According to one embodiment of the present invention, a method configures a computing environment. A configuration profile is identified by a computer system for the computing environment that is to be deployed in which the computing environment meets a security policy to run an application in the computing environment. A determination is made, by the computer system, as to whether the configuration profile for the computing environment meets the security policy for running the application in the computing environment. The configuration profile for the computing environment is deployed, by the computer system, to configure the computing environment for the application in response to the configuration profile meeting the security policy.

According to another embodiment of the present invention, a deployment system comprises a computer system that operates to identify a configuration profile for a computing environment that is to be deployed in which the computing environment meets a security policy to run an application in the computing environment; determine whether the configuration profile for the computing environment meets the security policy for running the application in the computing environment for the application; and deploy the configuration profile for the computing environment to configure the computing environment in response to the configuration profile meeting the security policy According to yet another embodiment of the present invention, a computer program product for configuring a computing environment comprises a computer-readable-storage media with first program code, second program code, and third program code stored on the computer-readable storage media. The first program code is executable by a computer system to cause the computer system to identify a configuration profile for the computing environment that is to be deployed in which the computing environment meets a security policy for running an application in the computing environment. The second program code is executable by the computer system to cause the computer system to determine whether the configuration profile for the computing environment meets the security policy for running the application in the computing environment. The third program code is executable by the computer system to cause the computer system to deploy the configuration profile for the computing environment to configure the computing environment for the application in response to the configuration profile meeting the security policy.

DETAILED DESCRIPTION

Figure 1:
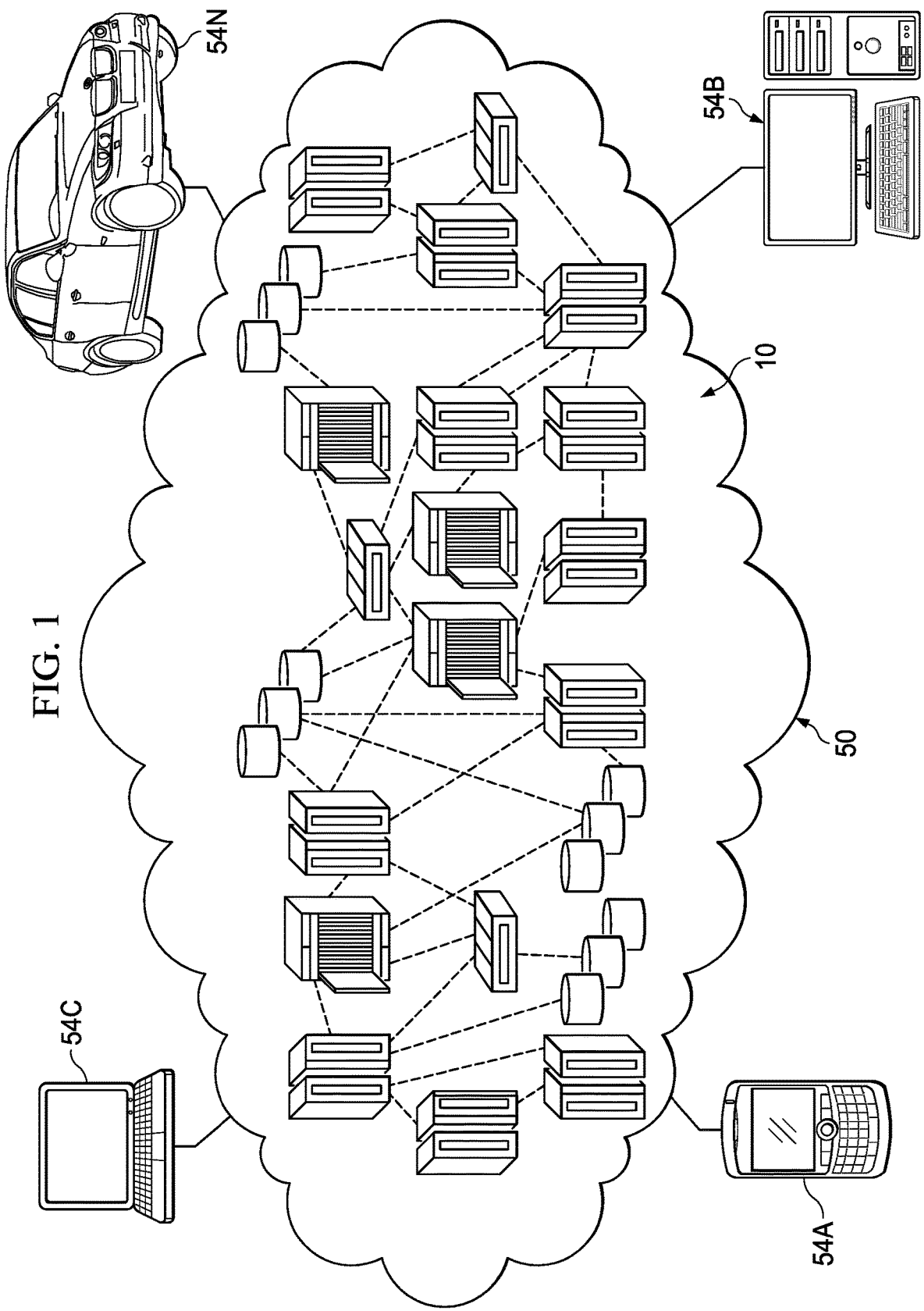
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that the monitoring of metrics in a cloud computing environment such as a landing zone occur after time and money have been expended to provision or set up the cloud computing environment. The illustrative embodiments recognize and take into account that any lack of compliance to desired security policies can lead to additional time and expense to cure those deficiencies. Further, the illustrative embodiments recognize and take into account that security of compliance holes can be devastating with respect to protecting confidential information when security policies are not met by the cloud computing environment. The illustrative embodiments recognize and take into account that it would be desirable to determine whether a landing zone provision for an application can meet a security policy prior to deploying the landing zone with the application.

Thus, the illustrative embodiments provide a method, apparatus, computer system, and computer program code for security compliance of computing environments such as a landing zone in a cloud computing environment. A method, apparatus, system, and computer program product can be used to configure a computing environment. A configuration profile is identified by a computer system for the computing environment that is to be deployed in which the computing environment meets a security policy to run an application in the computing environment. A determination is made, by the computer system, as to whether the configuration profile for the computing environment meets the security policy for running the application in the computing environment. The configuration profile for the computing environment is deployed, by the computer system, to configure the computing environment for the application in response to the configuration profile meeting the security policy.

Referring now to FIG. 1, an illustration of cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 in cloud computing environment 50 can communicate with any type of computerized device over any type of network and/or network addressable connection (e.g., using a web browser).

Figure 2:
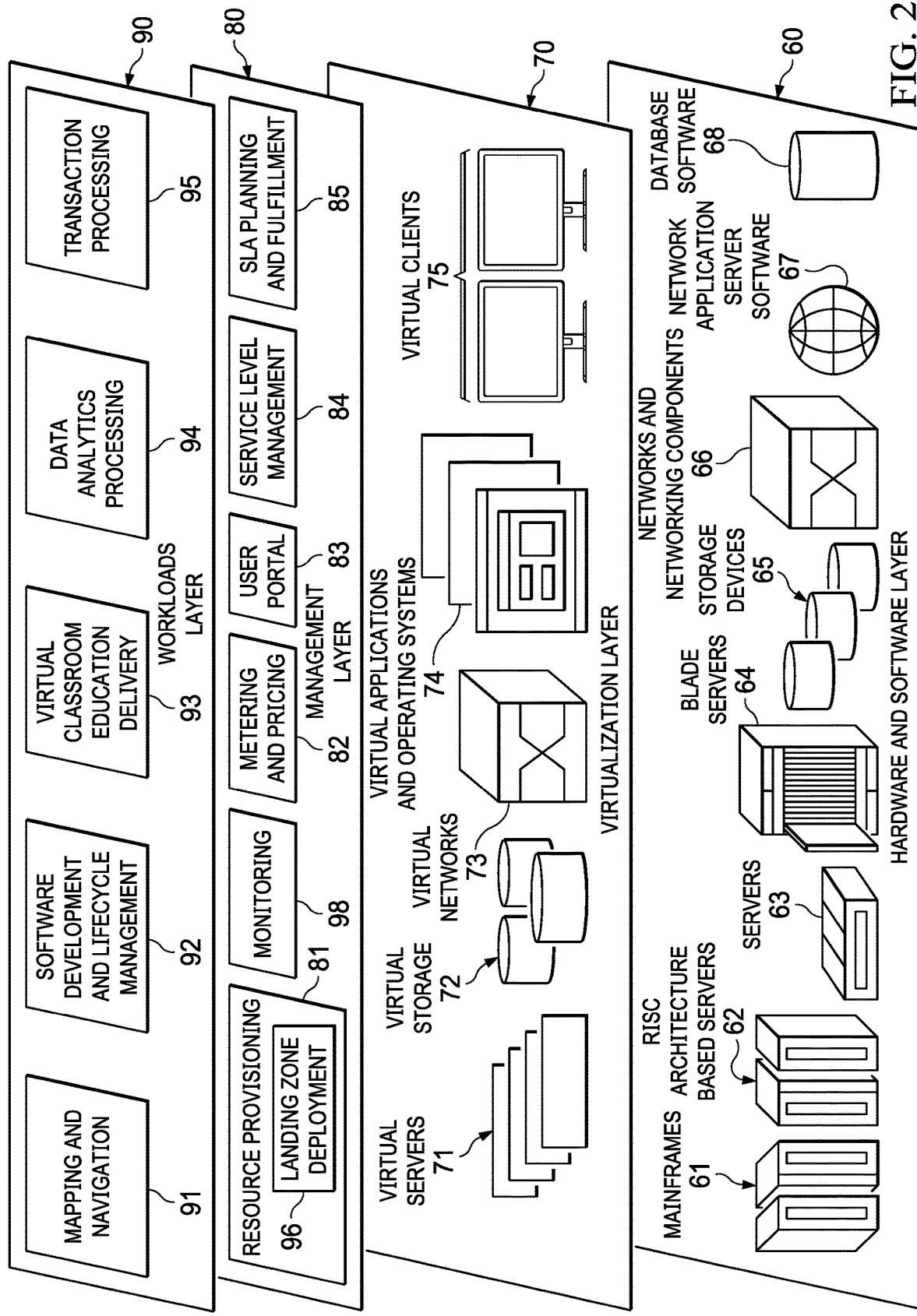
FIG. 2 is a set of functional abstraction layers provided by cloud computing environment 50 in FIG. 1 is shown.

Referring now to FIG. 2, a set of functional abstraction layers provided by cloud computing environment 50 in FIG. 1 is shown. It should be understood in advance that the components, layers, and functions shown in FIG. 2 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In this illustrative example, resource provisioning 81 can include landing zone deployment 96 for landing zones in cloud computing environment 50 in FIG. 1 or a network in a physical location that accesses cloud computing environment 50 in FIG. 1. Management layer 80 also includes monitoring 98 which can monitor applications deployed onto a secure landing zone to determine whether the applications, secure landing zones, or both continue to meet security criteria. As a result, in the illustrative example, landing zone deployment 96 can provide services configuring secure landing zones that meet security policies and deploying applications onto those secure landing zones in an automated manner that provides meeting one or more security policies for the landing zone in cloud computing environment 50. These deployments can be performed by landing zone deployment 96 in a manner that avoids the time and expense of current techniques that provision landing zones and then determine whether the deployment is in compliance with the security policy.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
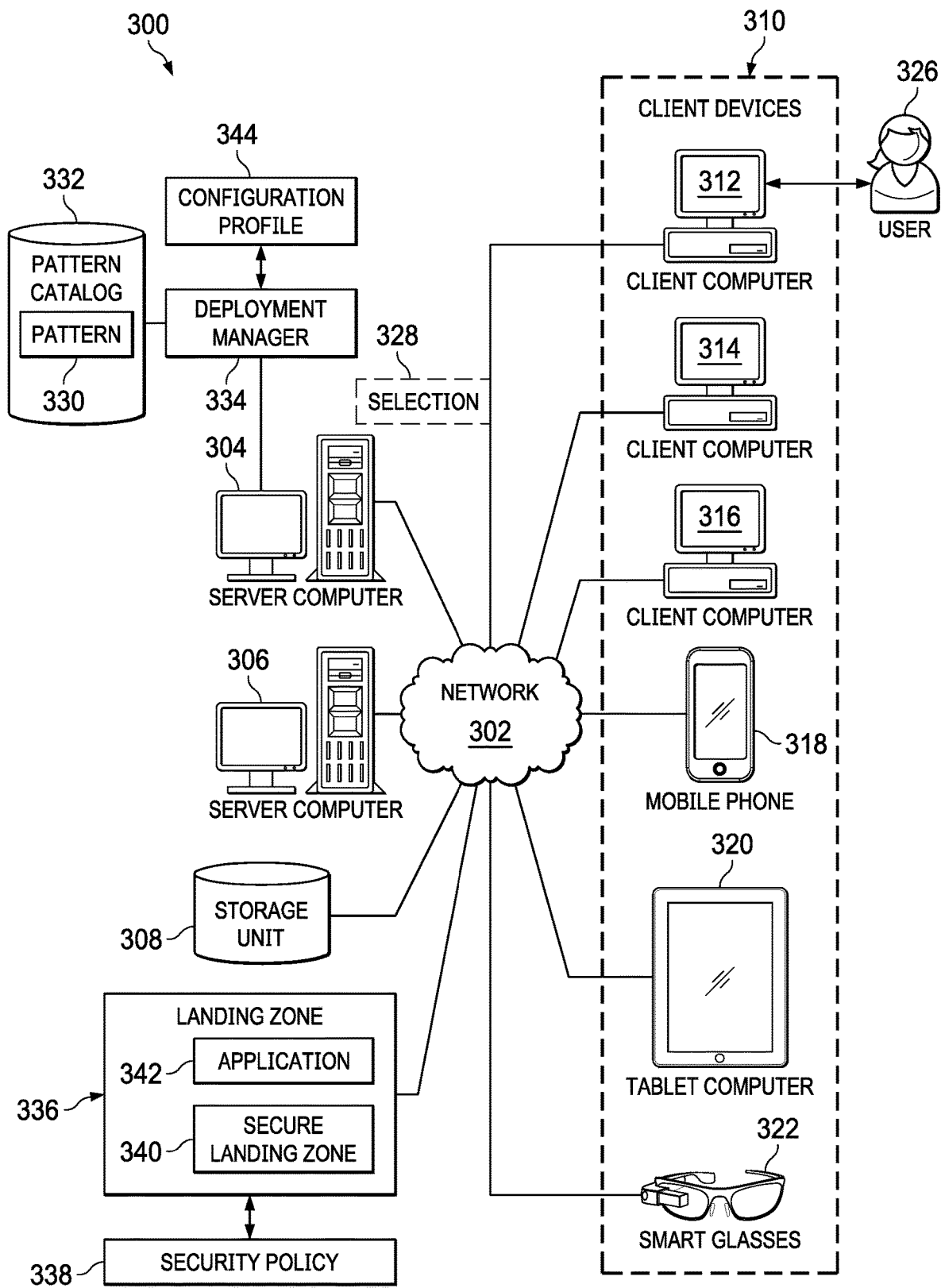
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wired, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 326 operates client computer 312 in client devices 310. As depicted, user 326 sends selection 328 of pattern 330 in pattern catalog 332 to deployment manager 334 to configure landing zone 336. In this illustrative example, pattern 330 defines information for configuring landing zone 336. For example, pattern 330 can define security, services, storage, servers, and other resources for landing zone 336.

As depicted, pattern 330 is designed to meet security policy 338. Pattern 330 is generated within intent that the implementation of pattern 330 to form landing zone 336 that results in landing zone 336 meeting security policy 338. Landing zone 336 can also be referred to as secure landing zone 340 when landing zone 336 meets security policy 338.

Landing zone 336 is an example of a computing environment that can be configured in cloud computing environment 50 in FIG. 1. In this illustrative example, landing zone 336 is required to meet security policy 338 to provide a desired level of security to run application 342. In this illustrative example, application 342 can be, for example, a financial application, a telecommunications application, or some other type of application.

In this illustrative example, deployment manager 334 can operate to manage deployment of landing zone 336 in a manner that provides a desired level of security. In this illustrative example, landing zone 336 is not configured until it is determined that pattern 330 can be deployed in a manner that needs security policy 338.

As depicted, deployment manager 334 creates configuration profile 344 from pattern 330. Configuration profile 344 contains the information needed to configure landing zone 336 according to pattern 330. Configuration profile 344 can also be referred to as a deployment package, which contains information such as data, object definitions, binary files, and other information to configure landing zone 336.

In this illustrative example, pattern 330 is designed to meet security policy 338. However, an actual deployment or use of pattern 330 to configure landing zone 336 may not meet security policy 338. In other words, it is possible that landing zone 336 may not meet security policy 338 even though pattern 330 was created with the intent that landing zone 336 meets security policy 338 when landing zone 336 is configured using pattern 330.

In this illustrative example, deployment manager 334 analyzes configuration profile 344 to determine whether the deployment of configuration profile 344 will result in landing zone 336 meeting security policy 338. This analysis can be performed without actually deploying configuration profile 344 and configuring landing zone 336. The analysis can be performed to avoid situations where configuration profile 344 does not result in landing zone 336 meeting security policy 338 even though pattern 330 was designed to meet security policy 338.

If the analysis of configuration profile 344 indicates that configuring landing zone 336 using configuration profile 344 will meet security policy 338, deployment manager 334 can proceed to configure landing zone 336 using configuration profile 344. If the analysis indicates landing zone 336 will not meet security policy 338, landing zone 336 can still be configured by deployment manager 334 using configuration profile 344 in some circumstances. For example, the configuration of landing zone 336 can proceed when this landing zone is intended to be used for testing purposes.

In this illustrative example, deployment manager 334 can also operate to monitor deployed landing zones. For example, deployment manager 334 can monitor landing zone 336 with application 342 after the configuration of landing zone 336 using configuration profile 344. This monitoring of landing zone 336 can be performed for compliance with security policy 338 after deploying configuration profile 344. A set of actions can be performed if landing zone 336 in which application 342 is deployed becomes out of compliance with security policy 338.

As used herein, a "set of," when used with reference to items, means one or more items. For example, a "set of actions" is one or more actions. The set of actions can include, for example, at least one of sending a notification, logging an out of compliance event, halting execution of landing zone 336, or other suitable actions.

Figure 4:
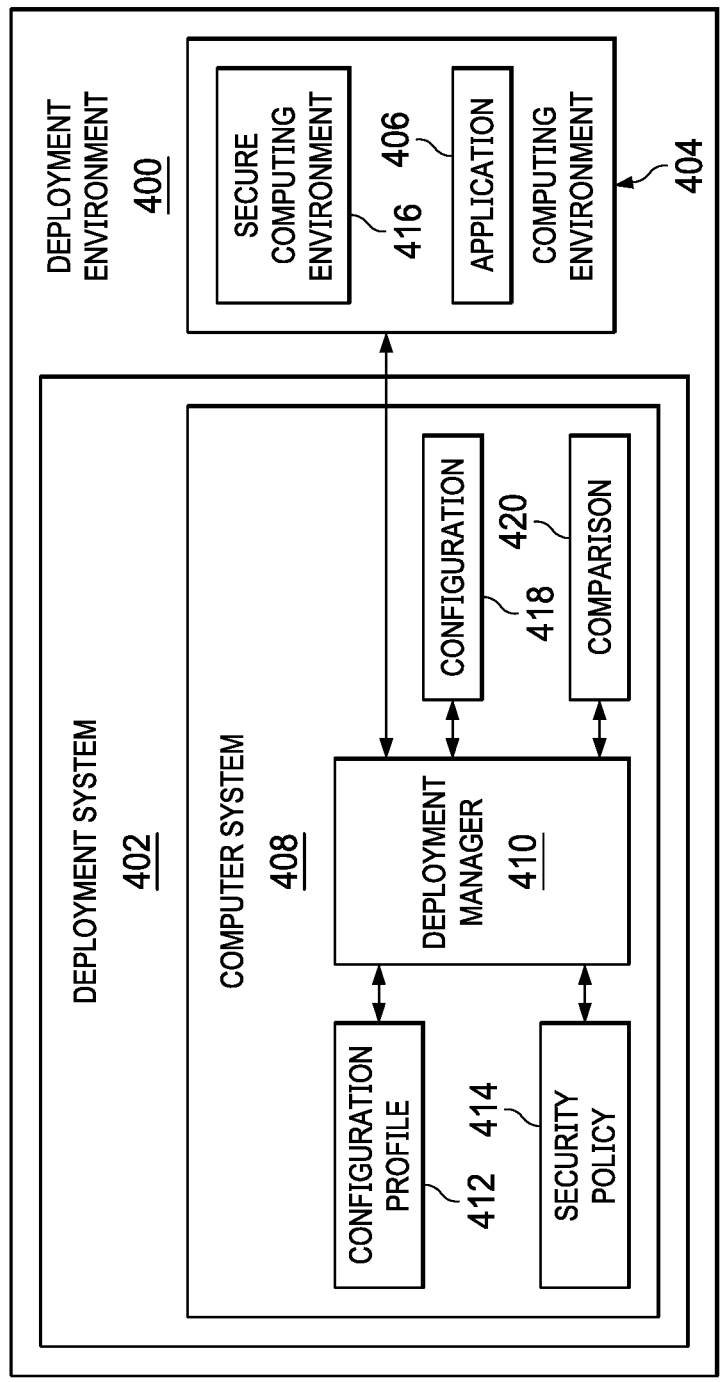
FIG. 4 is a block diagram of a deployment environment in accordance with an illustrative embodiment.

With reference now to FIG. 4, a block diagram of a deployment environment is depicted in accordance with an illustrative embodiment. In this illustrative example, deployment environment 400 includes components that can be implemented in hardware such as the hardware shown in network data processing system 300 in FIG. 3.

In this illustrative example, deployment system 402 in deployment environment 400 can operate to manage computing environment 404. Computing environment 404 is a collection of hardware and software that supports application 406 in computing environment 404.

In this illustrative example, computing environment 404 can take a number of different forms. For example, computing environment 404 can be one of a landing zone, a cloud account, a resource group, a space, a sub account within an enterprise account, a data center, a lab environment, a namespace, or some other type of computing environment. The management of computing environment 404 can include at least one of configuring computing environment 404, monitoring computing environment 404, or other actions with respect to computing environment 404. Application 406 is software and can include, for example, a financial application, a telecommunications application, or some other suitable type of application. For example, when application 406 is a financial application, application 406 can be a payroll application, a securities transaction program, an auditing application, or other suitable types of applications.

As depicted, deployment system 402 comprises computer system 408 and deployment manager 410. In this illustrative example, deployment manager 410 is located in computer system 408.

Deployment manager 410 can be implemented in software, hardware, firmware or a combination thereof. When software is used, the operations performed by deployment manager 410 can be implemented in program code configured to run on hardware, such as a processor unit. When firmware is used, the operations performed by deployment manager 410 can be implemented in program code and data and stored in persistent memory to run on a processor unit. When hardware is employed, the hardware may include circuits that operate to perform the operations in deployment manager 410.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 408 is a physical hardware system and includes one or more data processing systems. When more than one data processing system is present in computer system 408, those data processing systems are in communication with each other using a communications medium. The communications medium can be a network. The data processing systems can be selected from at least one of a computer, a server computer, a tablet computer, or some other suitable data processing system.

In this illustrative example, deployment manager 410 in computer system 408 can operate to perform a number of different steps in managing computing environment 404. For example, deployment manager 410 can identify configuration profile 412 for computing environment 404 that is to be deployed in which computing environment 404 meets security policy 414 for application 406 to be run in computing environment 404.

Configuration profile 412 is information that is used to create or configure computing environment 404. In this illustrative example, computing environment 404 can be configured when adjustments are made to computing environment 404. Configuration profile 412 can include, for example, program code, configuration files, libraries, binary files, object definitions, or other data that can be used to configure computing environment 404 to meet security policy 414. When computing environment 404 has been configured to meet security policy 414, computing environment 404 can also be referred to as secure computing environment 416.

Security policy 414 is information describing the security that is to be present in computing environment 404. In this illustrative example, security policy 414 can comprise at least one of a security control, a rule, a regulation, or other information needed to define the security that is to be present in computing environment 404.

In this illustrative example, security policy 414 can specify rules that implement or follow directives, regulations, laws, standards, mandates, or other guidance with respect to security that is to be implemented in computing environment 404. These rules in security policy 414 can include rules for at least one of network security, access control, data security, auditing, logging, data loss prevention, denial of service prevention, a firewall, network segmentation, behavioral analytics, intrusion invention, wireless security, or other items to provide a desired level of security in computing environment 404.

In this illustrative example, the particular policy selected for security policy 414 can change depending on various factors. For example, security policy 414 can be selected based on the type of application 406 that is to be run in computing environment 404. For example, one security policy can be selected for security policy 414 when application 406 is a financial application. Another security policy can be selected for security policy 414 when application 406 is a telecommunications application. Other security policies can be selected for security policy 414 when application 406 takes yet other forms. Further, security policy 414 can be selected for a particular application. For example, security policy 414 can be selected based on the particular vendor of the particular application that is selected to be application 406 that runs in computing environment 404.

Further, deployment manager 410 can determine whether configuration profile 412 for computing environment 404 meets security policy 414 for running application 406 in computing environment 404. Deployment manager 410 can deploy configuration profile 412 for computing environment 404 to configure computing environment 404 for application 406 in response to configuration profile 412 meeting security policy 414. In other words, computing environment 404 is configured such that computing environment 404 can provide at least one of a control, a service, a process, a setting, or other resource such that application 406 can run in a manner that meets security policy 414. In this illustrative example, the type of application 406 that is to be run in computing environment 404 can be used to determine what security policy should be met by computing environment 404.

In this illustrative example, determining whether configuration profile 412 for computing environment 404 meets security policy 414 can be performed by identifying configuration 418 of computing environment 404 using configuration profile 412; comparing configuration 418 of computing environment 404 with security policy 414 to form comparison 420; and determine whether configuration profile 412 meets security policy 414 based on comparison 420. A number of different actions can be taken by deployment manager 410 depending on whether configuration profile 412 meets security policy 414.

Figure 5:
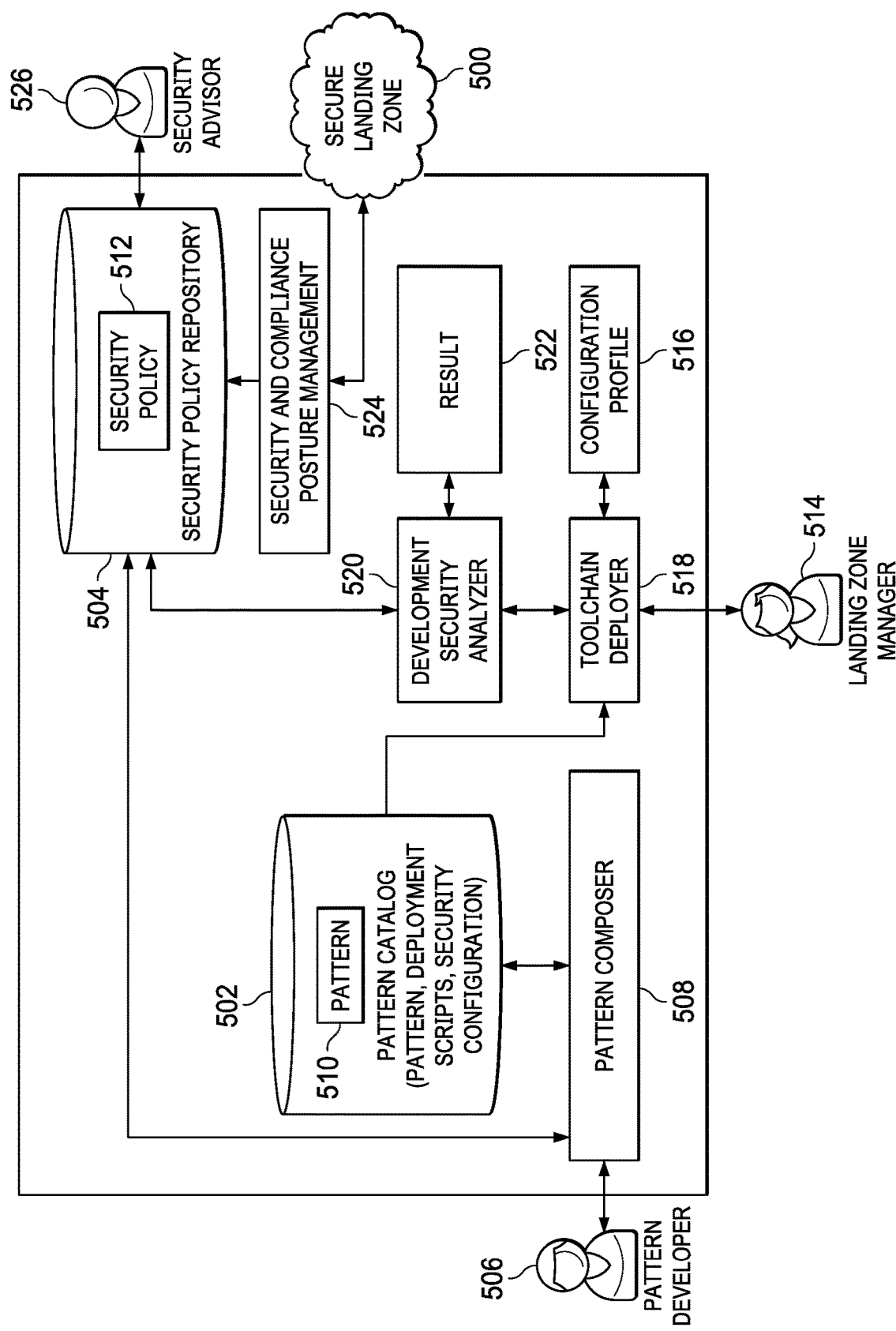
FIG. 5 is an illustration of dataflow automated security compliance for a computing environment in a form of a landing zone in a cloud in accordance with an illustrative embodiment.

Turning next to FIG. 5, an illustration of dataflow automated security compliance for a computing environment in a form of a landing zone in a cloud is depicted in accordance with an illustrative embodiment. In this illustrative example, examples of components that may be used in deployment system 402 in FIG. 4 to deploy secure landing zone 500 are depicted. In this illustrative example, secure landing zone 500 is an example of one implementation for secure computing environment 416 in FIG. 4.

In this illustrative example, pattern catalog 502 stores information that may be selected to configure secure landing zone 500. For example, pattern catalog 502 can include patterns, deployment scripts, and security configurations that meet one or more security policies stored in security policy repository 504. The information in a pattern can be located in a single file or a group of files that contains configurations, policies, settings, and other information used to configure a landing zone in a cloud environment.

This information can be created by pattern developer 506 using pattern composer 508. As depicted, pattern developer 506 is a user who can create or modify patterns in patterns catalog 502 using pattern composer 508. In this illustrative example, pattern composer 508 can be a software program or service that enables generating and editing templates such as patterns for use in configuring landing zones.

In this illustrative example, pattern developer 506 can create patterns that comply with different security policies. These security policies may be based on particular applications that will run in the landing zones. The security policies can be based on whether an application is used by financial, government, or healthcare institutions. For example, pattern composer 508 can create pattern 510 using security policy 512 in security policy repository 504. Security policy 512 can be selected based on the particular application that is to be run in secure landing zone 500.

In this illustrative example, the deployment of secure landing zone 500 is performed by landing zone manager 514 operating toolchain deployer 518. As depicted, landing zone manager 514 is a user who can select pattern 510 from pattern catalog 502 for use in configuring secure landing zone 500 that meets security policy 512.

In this illustrative example, landing zone manager 514 can create configuration profile 516 for configuring secure landing zone 500 using toolchain deployer 518. In this illustrative example, toolchain deployer 518 is a set of programming tools that can be used by landing zone manager 514 to create configuration profile 516 to deploy secure landing zone 500 meeting security policy 512. Pattern 510 is selected based on the particular application that is to be deployed in secure landing zone 500.

In one illustrative example, toolchain deployer 518 can include Terraform which is an open source infrastructure as code that is available from HashiCorp. In this illustrative example, toolchain deployer 518 can generate configuration profile 516 in the form of a Terraform plan. The Terraform plan describes items such as resources that will be executed, the delta or change between the current state of a resource and desired state, and other information needed to deploy a landing zone in a cloud environment.

In this illustrative example, configuration profile 516 is not immediately used to deploy secure landing zone 500. Instead, configuration profile 516 is analyzed using deployment security analyzer 520. The analysis is made to determine whether a landing zone deployed using configuration profile 516 will result in secure landing zone 500 meeting security policy 512. As depicted, deployment security analyzer 520 compares configuration profile 516 with security policy 512 to determine whether a landing zone deployed using configuration profile 516 will meet security policy 512.

For example, the analysis can include comparing cloud service and resource configuration specified by configuration profile 516 to rules and security policy 512. This analysis can include analyzing the cloud provider, pattern 510, or other configurations that are performed using configuration profile 516. In response to the analysis, deployment security analyzer 520 generates result 522 from this comparison.

As depicted, security analyzer 520 returns result 522 to toolchain deployer 518. If result 522 indicates that configuration profile 516 meets security policy 512, then toolchain deployer 518 deploys configuration profile 516 to create secure landing zone 500. If result 522 indicates that configuration profile 516 does not meets security policy 512, then toolchain deployer 518 can take actions other than deploying configuration profile 516. For example, toolchain deployer 518 can send a message for alert indicating that configuration profile 516 cannot be used to deploy secure landing zone 500 when configuration profile 516 does not meet security policy 512. In another illustrative example, toolchain deployer 518 can continue to configure secure landing zone 500 even though this landing zone does not meet security policy 512 when the deployment is for testing purposes.

After secure landing zone 500 has been deployed for writing an application, secure landing zone 500 can be monitored by security and compliance posture management 524. For example, security and compliance posture management 524 can be compared to current state of secure landing zone 500 with security policy 512 to determine whether secure landing zone 500 still meets security policy 512.

Changes over time in at least one of secure landing zoned 500 or security policy 512 can cause secure landing zone 500 to fall out of compliance with security policy 512. In this illustrative example, security policies can be managed by security advisor 526 operating security and compliance posture management 524. For example, security advisor 526 may make changes to security policy 512 as well as other security policies in security policy repository 504. These changes can be made based on changes in at least one of a requirement, a law, a federal regulation, a state regulation, a standard, or other source that can affect rules in security policies.

If during monitoring of secure landing zone 500, secure landing zone 500 no longer meets security policy 512, security and compliance posture management 524 can take a number of different actions. For example, security and compliance posture management 524 can send a notification of noncompliance, block communications to and from secure landing zone 500, cease operation of secure landing zone 500, generate a log entry of the noncompliance, or other suitable actions.

Thus, these different components in the steps performed by the components in FIG. 5 provide an example of deploying resources for running an application in a landing zone. Different patterns can be designed to implement different security policies for different applications. In the illustrative example, selection of pattern 510 results in steps being automatically formed to deploy pattern 510 to configure a landing zone to form secure landing zone 500. In the illustrative examples, configuration profile 516 is generated using pattern 510 in which configuration profile 516 includes information used to configure secure landing zone 500. This configuration profile can be analyzed to ensure that use of configuration profile 516 results in secure landing zone 500 that meets security policy 512.

Further, continuous monitoring of secure landing zone 500 can be performed after configuring secure landing zone 500. This continuous monitoring can be performed to ensure that changes do not result in secure landing zone 500 no longer meeting security policy 512. In this manner, changes to secure landing zone 500 include responsive updates to services, an addition of services, a removal of services, new features, updates to applications, or other changes in secure landing zone 500 that do not result in secure landing zone 500 falling out of compliance with security policy 512. Further, this monitoring can take into account that security policy 512 can change in response to changes in laws, standards, goals, or policies with respect to security in secure landing zone 500. Further, the steps can be implemented to ensure that secure landing zone 500 also meets other types of policies in addition to policies with respect to security.

These different steps can be formed without needing user input after selection of a pattern for deployment. In this manner, the time-consuming cost for analyzing a landing zone configured using a configuration profile as currently performed can be reduced or eliminated. Additionally, result 522 can also be provided as feedback for use in adjusting pattern 510 in pattern catalog 502. For example, the feedback can be sent back to pattern composer 508. This feedback can be used by at least one of pattern developer 506 or pattern composer 508 to adjust pattern 510 such that future uses of pattern 510 may meet security policy 512. For example, pattern 510 may have met security policy 512 at the time pattern 510 was generated. Changes to at least one of components and landing zones or security policy 512 may result in pattern 510 no longer meeting security policy 512 when used at a later time to configure landing zone.

The depicted example in FIG. 5 is only provided as an example of one manner in which components in deployment environment 400 in FIG. 4 can be implemented. These examples are not meant to limit the manner in which other illustrative examples can be implemented. For example, in toolchain deployer 518, deployment security analyzer 520 and security and compliance posture management 524 are shown as separate components that provide functions described for deployment manager 410 in FIG. 4. In other illustrative examples, these components can be combined as a single component or distributed as multiple components.

In one illustrative example, one or more features are present that overcome a technical problem with configuring landing zones in a manner that meets desired security. As a result, one or more technical solutions may provide the ability to automatically deploy a landing zone based on the selection of a pattern for the landing zone. In the illustrative examples, a configuration profile is generated based on the selection of the pattern. The configuration profile is analyzed to determine whether a landing zone deployed using the configuration profile will meet security policy that is desired for a particular application. The configuration profile can be automatically deployed when analysis indicates that the landing zone configured using the configuration profile will meet the security policy.

Computer system 408 in FIG. 4 can be configured to perform at least one of the steps, operations, or actions described in the different illustrative examples using software, hardware, firmware, or a combination thereof. As a result, computer system 408 operates as a special purpose computer system in which deployment manager 410 in computer system 408 can deploy computing environment 404. In particular, deployment manager 410 transforms computer system 408 into a special purpose computer system as compared to currently available general computer systems that do not have deployment manager 410. In this illustrative example, computer system 408 can automatically perform configuration of the landing zone by deploying a configuration profile that has been determined to meet a security policy for a particular implementation of landing zone.

The illustration of deployment environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, deployment manager 410 is shown as forming steps with respect to a single computing environment. In other illustrative examples, one or more computing environments may be configured by deployment manager 410 in addition to or in place of computing environment 404. Further, these additional computing environments may use the same or different security policy as computing environment 404.

Further, the illustration of the different steps performed with respect to computing environment 404 in the form of secure landing zone 500 is not to limit what computing environments may be configured using the illustrative examples. For example, the different steps may be applied to other types of computing environments in addition or in place of a landing zone. These other types of computing environments may be selected from at least one of a cloud account, a resource group, a space, a sub account within an enterprise account, a data center, a lab environment, a namespace, or other type of computing environment. Further, deployment manager 410 can be used to manage different types of computing environments. For example, deployment manager 410 can be used to configure a landing, a namespace, and a cloud account.

In the illustrative example, configuration profile 412 can configure computing environment 404 to meet one or more security policies in addition to security policy 414. In other words, computing environment 404 may meet more than one security policy depending on the particular implementation.

As another example, other types of policies can be implemented in addition to or in place of security policy 512 or compliance in configuring computing environment 404. For example, a regulation policy can be included in addition to or in place of security policy 414. The regulation policy includes rules with respect to complying with a federal regulation, a state law, a government regulation, an agency rule, an industry standard, or other rule for which compliance is required within computing environment 404. For example, the regulation policy can define what types of transactions are authorized or unauthorized as defined by a law or regulation within computing environment 404. As another example, the regulation policy can define how financial transactions are to be performed and logged for auditing. When other policies are included in addition to security policy 414, these different types of policies can be collectively referred to as a compliance policy.

Figure 6:
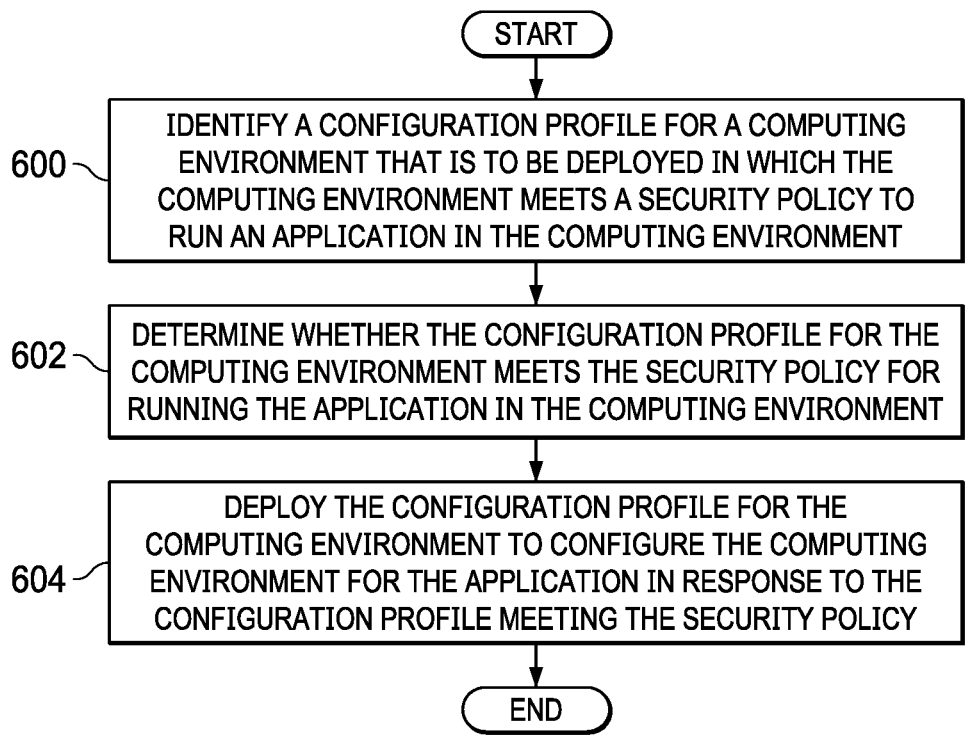
FIG. 6 is a flowchart of a process for configuring a computing environment in accordance with an illustrative embodiment.

Turning next to FIG. 6, a flowchart of a process for configuring a computing environment is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in deployment manager 334 in FIG. 3 and deployment manager 410 in computer system 408 in FIG. 4.

The process begins by identifying a configuration profile for a computing environment that is to be deployed in which the computing environment meets a security policy to run an application in the computing environment (step 600).

The process determines whether the configuration profile for the computing environment meets the security policy for running the application in the computing environment (step 602).

The process deploys the configuration profile for the computing environment to configure the computing environment for the application in response to the configuration profile meeting the security policy (step 604). The process terminates thereafter. The deployment in step 604 results in the necessary changes to be made to the computing environment to meet the security policy.

The steps in the process in flowchart in FIG. 6 can be performed automatically to provide security compliance for a computing environment such as a landing zone in a cloud environment. As depicted, these different steps can be performed in a manner that enables configuring a landing zone to provide security meeting a security policy.

Figure 7:
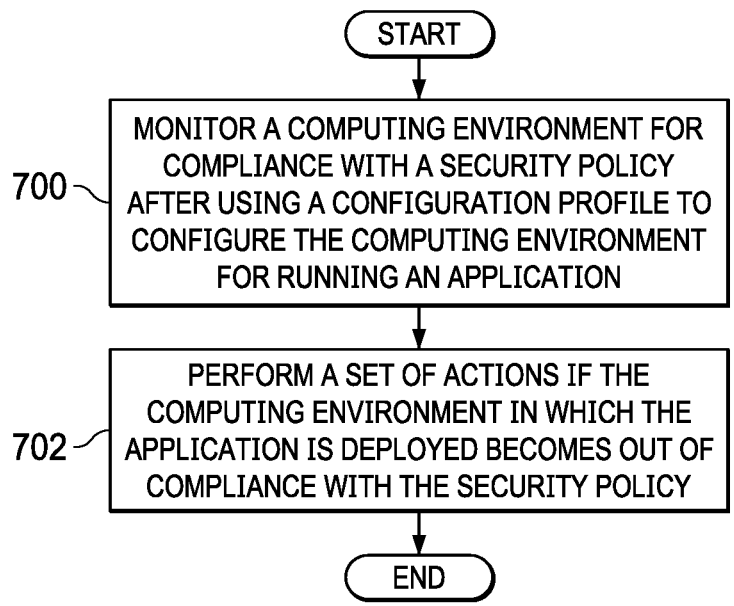
FIG. 7 is an illustration of a flowchart of a process for monitoring a computing environment in accordance with an illustrative embodiment.

Turning next to FIG. 7, an illustration of a flowchart of a process for monitoring a computing environment is depicted in accordance with an illustrative embodiment. The steps in FIG. 7 are examples of additional steps that can be performed in addition to the steps described for FIG. 6.

The process monitors a computing environment for compliance with a security policy after using the configuration profile to configure the computing environment for running an application (step 700). In step 700, the process determines whether the computing environment running the application continues to meet the security policy over time. Changes can occur over time that can result in the computing environment no longer meeting the security policy. These changes can occur in at least one of the computing environment, the application, or the security policy.

For example, updates to components, such as a service or access control structure, in the computing environment can result in the computing environment no longer meeting the security policy. As another example, a change to the application also may result in the computing environment no longer meeting the security policy for running the application. As yet another example, changes to the security policy may also result in the computing environment no longer meeting the security policy.

The process performs a set of actions if the computing environment in which the application is deployed becomes out of compliance with the security policy (step 702). The process terminates thereafter. In other words, the set of actions can be performed when the computing environment does not meet the security policy when checked at a later time after configuring the computing environment. The steps can be performed to take into account changes that may occur that can result in the computing environment not meeting the security policy.

Steps for monitoring the landing zone in FIG. 7 can also be formed automatically as part of an end-to-end compliance of a landing zone with the security policy. With this monitoring, compliance with the security policy can be determined in a manner that takes into account changes in at least one of the computing environment or the security policy after the original deployment of the landing that met the security policy at that time.

Figure 8:
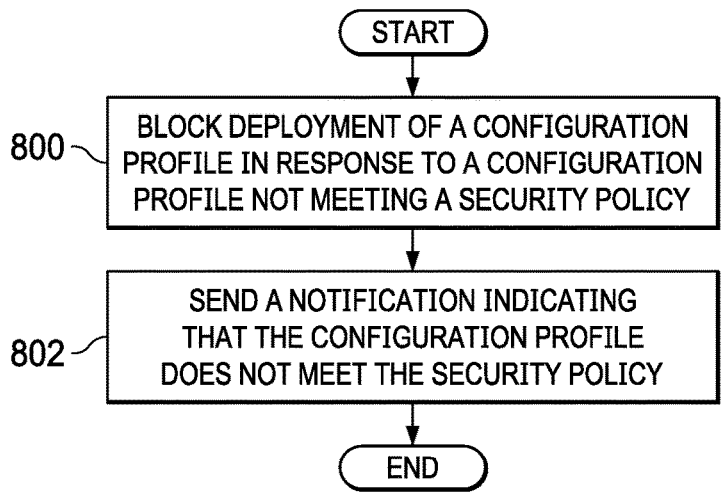
FIG. 8 is a flowchart of a process for blocking deployment of a configuration profile in accordance with an illustrative embodiment.

With reference to FIG. 8, a flowchart of a process for blocking deployment of a configuration profile is depicted in accordance with an illustrative embodiment. In this flowchart, an additional step is illustrated that can be performed with the steps for configuring a computing environment in FIG. 6.

The process blocks deployment of a configuration profile in response to the configuration profile not meeting a security policy (step 800). Further, the process can send a notification indicating that the configuration profile does not meet to security policy (step 802). The process terminates thereafter.

Figure 9:
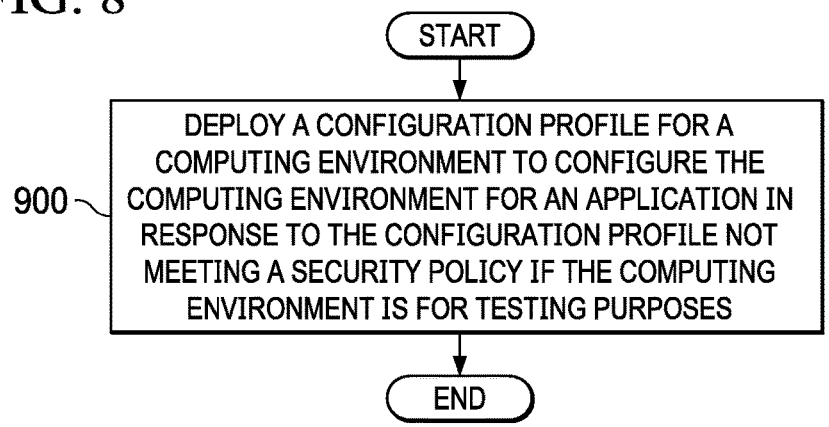
FIG. 9 is a flowchart of a process for deploying a configuration profile that does not meet a security policy in accordance with an illustrative embodiment.

With reference to FIG. 9, a flowchart of a process for deploying a configuration profile that does not meet a security policy is depicted in accordance with an illustrative embodiment. In this flowchart, an additional step is illustrated that can be performed with the steps for configuring a computing environment in FIG. 6.

The process deploys a configuration profile for a computing environment to configure the computing environment for an application in response to the configuration profile not meeting a security policy if the computing environment is for testing purposes (step 900). The process terminates thereafter. In this case, the computing environment can be configured to run an application even though the security policy is not met because the computing environment is used for testing purposes. When used for testing purposes, the computing environment can be deployed in a sandbox or other controlled environment to avoid undesired actions occurring from not meeting the security profile. This type of deployment can be used to determine what changes are needed to meet the security profile.

Figure 10:
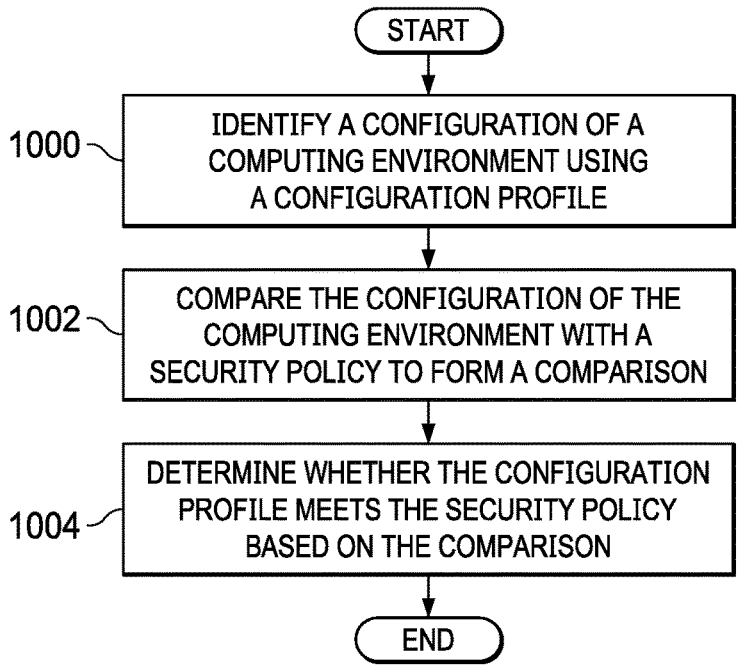
FIG. 10 is a flowchart of a process for determining whether a configuration profile meets a security policy in accordance with an illustrative embodiment.

Turning to FIG. 10, a flowchart of a process for determining whether a configuration profile meets a security policy is depicted in accordance with an illustrative embodiment. The process in this flowchart is an example of one manner in which step 602 in FIG. 6 can be implemented.

The process begins by identifying a configuration of a computing environment using a configuration profile (step 1000). In step 1000, the configuration can be determined in a number of different ways. For example, the configuration can be determined for a computing environment such as a landing zone using Terraform from HashiCorp. With this example, the configuration profile can be generated from a pattern for the landing zone. In this example, the configuration can take the form of a Terraform plan which identifies changes that are to be made to the computing environment using the configuration profile. The process compares the configuration of the computing environment with the security policy to form a comparison (step 1002).

The process determines whether the configuration profile meets the security policy based on the comparison (step 1004). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
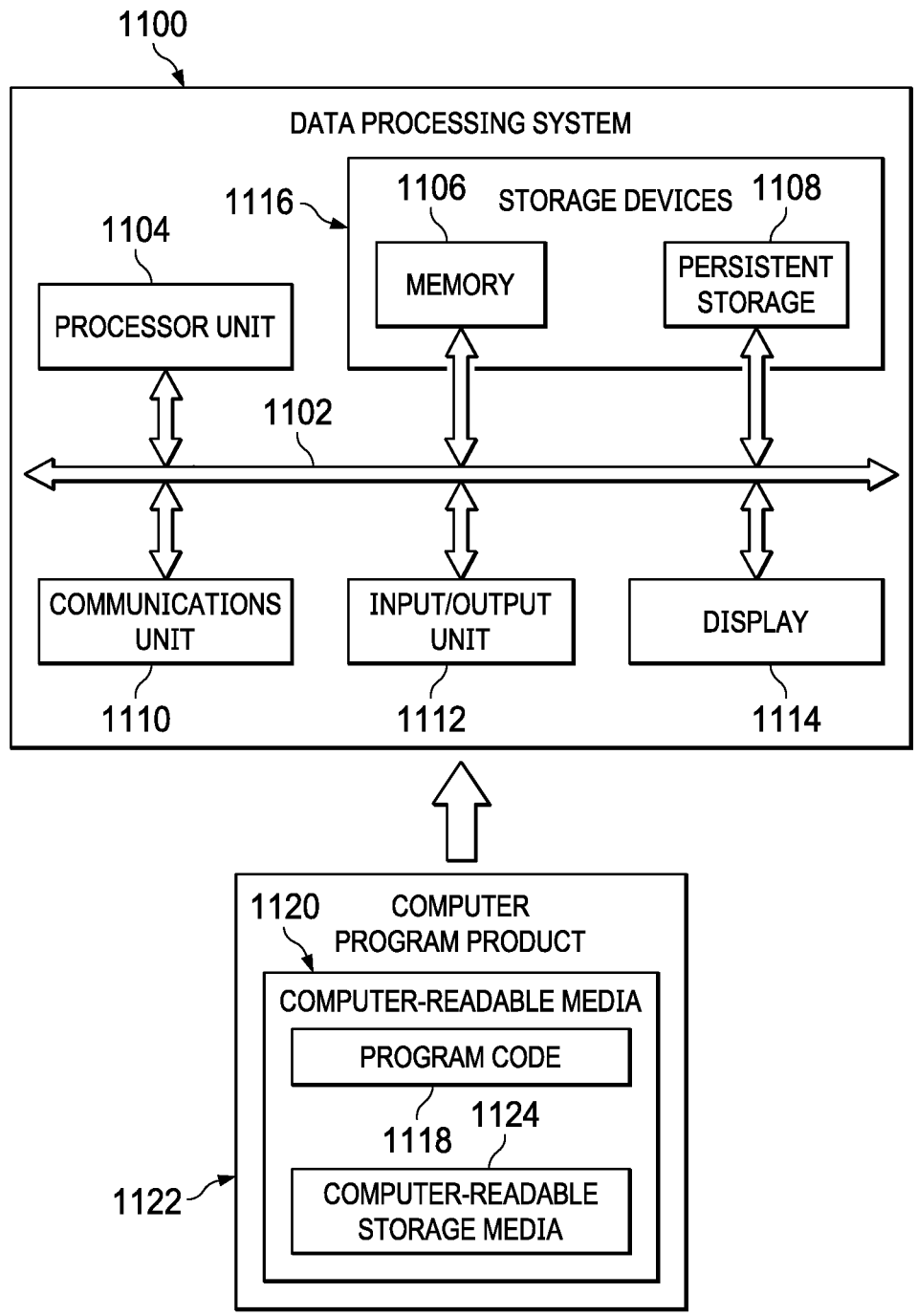
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 304, server computer 306, AND client devices 310 in FIG. 1. Data processing system 1100 can also be used to implement cloud computing nodes 10, personal digital assistant (PDA) or cellular telephone 54A, desktop computer 54B, laptop computer 54C, automobile computer system 54N in FIG. 1, computing systems in hardware and software layer 60 in FIG. 2, and computer system 408 in FIG. 4. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are program instructions and are also referred are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

Computer-readable storage media 1124 is a physical or tangible storage device used to store program code 1118 rather than a medium that propagates or transmits program code 1118. Computer-readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 can be transferred to data processing system 1100 using a computer-readable signal media. The computer-readable signal media are signals and can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Thus, the illustrative embodiments provide a computer-implemented method, computer system, and computer program product for configuring a computing environment to meet a security policy. A configuration profile is identified by a computer system for the computing environment that is to be deployed in which the computing environment meets a security policy to run an application in the computing environment. A determination is made, by the computer system, as to whether the configuration profile for the computing environment meets the security policy for running the application in the computing environment. The configuration profile for the computing environment is deployed, by the computer system, to configure the computing environment for the application in response to the configuration profile meeting the security policy.

Thus, illustrative examples can perform deployment and monitoring of a computing environment to verify meeting a security policy on a continuous basis. Further, the illustrative examples can also be implemented to monitor for compliance with other types of policies in addition to or in place of the security policy.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for configuring a provisioned computing environment, the method comprising: identifying, by a computer system, a pattern from a pattern catalog, wherein each pattern in the pattern catalog comprises information for a configuration of the provisioned computing environment to comply with a security policy to run an application in the provisioned computing environment; creating, by the computer system, a configuration profile based on the pattern, for the provisioned computing environment that is to be deployed in which the provisioned computing environment meets the security policy to run the application in the provisioned computing environment; determining, by the computer system, whether the configuration profile for the provisioned computing environment meets the security policy for running the application in the provisioned computing environment; and deploying, by the computer system, the configuration profile for the provisioned computing environment to configure the provisioned computing environment for the application in response to the configuration profile meeting the security policy.

2. The method of claim 1, wherein determining, by the computer system, whether the configuration profile for the provisioned computing environment meets the security policy for running the application in the provisioned computing environment comprises: identifying, by the computer system, the configuration of the provisioned computing environment using the configuration profile; comparing, by the computer system, the configuration of the provisioned computing environment with the security policy to form a comparison; and determining, by the computer system, whether the configuration profile meets the security policy based on the comparison.

3. The method of claim 1 further comprising: blocking, by the computer system, deploying of the configuration profile in response to the configuration profile not meeting the security policy.

4. The method of claim 1 further comprising: deploying, by the computer system, the configuration profile for the provisioned computing environment to configure the provisioned computing environment for the application in response to the configuration profile not meeting the security policy if the provisioned computing environment is for testing purposes.

5. The method of claim 1 further comprising: monitoring, by the computer system, the provisioned computing environment for compliance with the security policy after deploying the configuration profile to create the provisioned computing environment for running the application.

6. The method of claim 5 further comprising: performing, by the computer system, a set of actions if the provisioned computing environment in which the application is deployed becomes out of compliance with the security policy.

7. The method of claim 6, wherein the set of actions comprising:
updating, by the computer system, the pattern for complying with the security policy for
running the application in the provisioned computing environment for the application.

8. The method of claim 1, wherein the provisioned computing environment is one of a landing zone, a cloud account, a resource group, a space, a sub account within an enterprise account, a data center, a lab environment, and a namespace.

9. A deployment system comprising: one or more processor units, wherein the one or more processor units executes program instructions to: identify a pattern from a pattern catalog, wherein each pattern in the pattern catalog comprises information for a configuration of a provisioned computing environment to comply with a security policy to run an application in the provisioned computing environment; create a configuration profile based on the pattern for the provisioned computing environment that is to be deployed in which the provisioned computing environment meets the security policy to run the application in the provisioned computing environment; determine whether the configuration profile for the provisioned computing environment meets the security policy for running the application in the provisioned computing environment for the application; and deploy the configuration profile for the provisioned computing environment to configure the provisioned computing environment in response to the configuration profile meeting the security policy.

10. The deployment system of claim 9, wherein in determining whether the configuration profile for the provisioned computing environment meets the security policy for running the application in the provisioned computing environment, the number of processor units further execute program instructions to: identify the configuration of the provisioned computing environment using the configuration profile; compare the configuration of the provisioned computing environment for the application with the security policy to form a comparison; and determine whether the configuration profile meets the security policy based on the comparison.

11. The deployment system of claim 9, wherein the number of processor units further execute program instructions to: block deploying of the configuration profile in response to the configuration profile not meeting the security policy.

12. The deployment system of claim 9, wherein the number of processor units further execute program instructions to: deploy the configuration profile for the provisioned computing environment to configure the provisioned computing environment for the application in response to the configuration profile not meeting the security policy if the provisioned computing environment is for testing purposes.

13. The deployment system of claim 9, wherein the number of processor units further execute program instructions to: monitor the provisioned computing environment for compliance with the security policy after deploying the configuration profile to create the provisioned computing environment for running the application.

14. The deployment system of claim 13, wherein the number of processor units further execute program instructions to: perform a set of actions if the provisioned computing environment in which the application is deployed becomes out of compliance with the security policy.

15. The deployment system of claim 14, wherein the set of actions comprising: updating the pattern for complying with the security policy for running the application in the provisioned computing environment for the application.

16. The deployment system of claim 9, wherein the provisioned computing environment is one of a landing zone, a cloud account, a resource group, a space, a sub account within an enterprise account, a data center, a lab environment, and a namespace.

17. A computer program product for configuring a provisioned computing environment, the computer program product comprising: a computer-readable storage media; first program code, stored on the computer-readable storage media, executable by a computer system to cause the computer system to identify a pattern from a pattern catalog, wherein each pattern in the pattern catalog comprises information for a configuration of the provisioned computing environment to comply with a security policy to run an application in the provisioned computing environment; second program code, stored on the computer-readable storage media, executable by the computer system to cause the computer system to create a configuration profile based on the pattern for the provisioned computing environment that is to be deployed in which the provisioned computing environment meets the security policy for running the application in the provisioned computing environment; third program code, stored on the computer-readable storage media, executable by the computer system to cause the computer system to determine whether the configuration profile for the provisioned computing environment meets the security policy for running the application in the provisioned computing environment; and fourth program code, stored on the computer-readable storage media, executable by the computer system to cause the computer system to deploy the configuration profile for the provisioned computing environment to configure the provisioned computing environment for the application in response to the configuration profile meeting the security policy.

18. The computer program product of claim 17, wherein the second program code comprises: program code, stored on the computer-readable storage media, executable by the computer system to cause the computer system to identify the configuration of the provisioned computing environment using the configuration profile; program code, stored on the computer-readable storage media, executable by the computer system to cause the computer system to compare the configuration of the provisioned computing environment for the application with the security policy to form a comparison; and program code, stored on the computer-readable storage media, executable by the computer system to cause the computer system to determine whether the configuration profile meets the security policy based on the comparison.

19. The computer program product of claim 17 further comprising: fifth program code, stored on the computer-readable storage media, executable by the computer system to cause the computer system to block deploying of the configuration profile in response to the configuration profile not meeting the security policy.

20. The computer program product claim 17 further comprising: fifth program code, stored on the computer-readable storage media, executable by the computer system to cause the computer system to deploy the configuration profile for the provisioned computing environment to configure the provisioned computing environment for the application in response to the configuration profile not meeting the security policy if the provisioned computing environment is for testing purposes.

\* \* \* \* \*